(12) United States Patent
Sikora et al.

(10) Patent No.: US 7,401,147 B2
(45) Date of Patent: *Jul. 15, 2008

(54) METHOD AND SYSTEM FOR REGULATING THE DISPATCHING OF MESSAGES FOR REQUESTORS

(75) Inventors: Scott E. Sikora, Seattle, WA (US); Michael Ensminger, Bellevue, WA (US); Derek Robbecke, Renton, WA (US); Timothy Fenster, Seattle, WA (US); Mark McGregor, Edmonds, WA (US); Jesse Watson, Seattle, WA (US); Anh Tran, Seattle, WA (US)

(73) Assignee: Varolii Corporation, Seattle, WA (US)

( * ) Notice: Subject to any disclaimer, the term of this patent is extended or adjusted under 35 U.S.C. 154(b) by 286 days.

This patent is subject to a terminal disclaimer.

(21) Appl. No.: 11/389,587

(22) Filed: Mar. 24, 2006

(65) Prior Publication Data

US 2006/0168076 A1 Jul. 27, 2006

Related U.S. Application Data

(63) Continuation of application No. 10/922,224, filed on Aug. 19, 2004, now Pat. No. 7,069,303.

(60) Provisional application No. 60/497,179, filed on Aug. 21, 2003.

(51) Int. Cl.
*G06F 15/16* (2006.01)

(52) U.S. Cl. .................................................... 709/227

(58) Field of Classification Search ......... 709/200–206, 709/217–227
See application file for complete search history.

(56) References Cited

U.S. PATENT DOCUMENTS

| 5,247,569 | A | 9/1993 | Cave |
| 5,570,419 | A | 10/1996 | Cave |
| 6,002,748 | A | 12/1999 | Leichner |
| 6,633,910 | B1 | 10/2003 | Rajan et al. |
| 6,714,916 | B1 | 3/2004 | Robertson et al. |
| 6,816,878 | B1 | 11/2004 | Zimmers et al. |
| 7,069,303 | B2 * | 6/2006 | Sikora et al. ................ 709/206 |
| 2002/0069125 | A1 | 6/2002 | Bruck et al. |
| 2002/0087643 | A1 | 7/2002 | Parsons et al. |
| 2002/0124103 | A1 | 9/2002 | Maruyama et al. |
| 2003/0126258 | A1 | 7/2003 | Conkright et al. |

FOREIGN PATENT DOCUMENTS

| EP | 0551715 | 7/1993 |
| WO | WO-02/42979 A1 | 5/2002 |

\* cited by examiner

*Primary Examiner*—Moustafa M Meky
(74) *Attorney, Agent, or Firm*—Perkins Coie LLP (57) ABSTRACT

A method and system in an application service provider ("ASP") system for regulating the dispatching of event notification messages that generate return contacts. The ASP system is connected to various requestor systems and receives from those systems requests to send messages to designated recipients. The ASP system dispatches the messages by retrieving the requests from the request store, generating messages for the requests, and sending the generated messages at a requestor-specific message dispatch rate. The ASP system dynamically adjusts the message dispatch rate for a requestor in real time to help ensure that the requestor is not overwhelmed with return contacts.

40 Claims, 6 Drawing Sheets

METHOD AND SYSTEM FOR REGULATING THE DISPATCHING OF MESSAGES FOR REQUESTORS

CROSS-REFERENCE TO RELATED APPLICATION

This application is a continuation of U.S. patent application Ser. No. 10/922,224, filed Aug. 19, 2004, now U.S. Pat. No. 7,069,303 which claims the benefit of U.S. Provisional Patent Application No. 60/497,179, filed on Aug. 21, 2003, which applications are hereby incorporated herein by reference.

TECHNICAL FIELD

The described technology relates generally to dispatching messages and particularly to controlling the rate at which messages are dispatched.

BACKGROUND

Many organizations have a need to notify entities (e.g., individuals or companies) of events relating to that organization. These organizations may publish the events and allow the entities to access the published information on their own initiative. For example, if the organization is an airline, it may have a need to notify passengers who are booked on a flight of changes to the flight's schedule. These organizations can publish their events in various ways. For example, many airlines have telephone numbers or web sites through which the current status of each flight can be obtained. A passenger can call the number or visit the web site to determine whether their flight's schedule has been changed. Some organizations may allow entities to be notified in a more active manner by sending a notification directly to the entity. For example, when an airline has changed a flight's schedule, its computer systems may automatically place a call or send an electronic mail message to all the passengers who are booked on the flight informing them of the change.

It can be very expensive and time-consuming for an organization to develop or purchase the necessary software and hardware to send effective event notifications. As a result, an application service provider ("ASP") system has been developed to assist an organization in sending its event notifications. Because of economies of scale, such an ASP system may be able to dispatch event notifications in a less expensive and more efficient manner than can be done by an individual organization. Such an ASP system may connect to the computer systems of many organizations (e.g., via the Internet) and receive requests to send an event notification to a designated entity on behalf of an organization. Upon receiving a request from an organization, the ASP system may queue the request. Periodically, the ASP system retrieves the requests from the queue and, for each request, notifies the designated entity of the event.

Oftentimes, the notification of an event that is sent to an entity will result in the entity contacting the organization. For example, if a person is notified that their flight has been canceled, then that person may call the airline to reschedule. When a large number of event notifications are sent by the ASP system on behalf of an organization, the organization may not be able to effectively handle all the resulting return contacts by the entities that received the event notifications. It would be desirable to have an ASP system that would send event notifications in a way that the requesting organization is not overwhelmed with return contacts.

DETAILED DESCRIPTION

A method and system in an application service provider ("ASP") system for regulating the dispatching of event notification messages that generate return contacts is provided. In one embodiment, the ASP system is connected to various requestor systems and receives from those systems requests to send messages to designated recipients (e.g., entities). The ASP system may store the requests that it receives in a request store. The ASP system dispatches the messages by retrieving the requests from the request store, generating messages for the requests, and sending the generated messages at a requestor-specific message dispatch rate (e.g., 10 messages per minute for one requestor and 100 messages per minute for another requestor). These messages may optionally invite the recipients to contact the requestor. The ASP system dynamically adjusts the message dispatch rate for a requestor in real time to help ensure that the requestor is not overwhelmed with return contacts. The ASP system coordinates the forwarding of the return contacts from the recipients of messages to the requestor. For example, a return contact may be a reply to an electronic mail message sent by the ASP system. The ASP system may include a rate parameter store that stores requestor-specific rate parameters that indicate how the message dispatch rate is to be dynamically adjusted. For example, a requestor-specific rate parameter may be the maximum rate at which the requestor wants its messages to be dispatched. The ASP system dynamically adjusts the message dispatch rate for each requestor based on requestor-specific rate parameters and statistics relating to the return contacts for that requestor. For example, if the number of return contacts is more than anticipated, then the ASP system may reduce the message dispatch rate for that requestor. In this way, the number of return contacts for a requestor can be regulated by dynamically adjusting the message dispatch rate for that requestor.

The ASP system in one embodiment provides a web-based user interface that allows a requestor to set its requestor-specific rate parameters. The ASP system may allow a requestor to specify the return contact statistic that is to be used to control the message dispatch rate, referred to as a "requestor-specific control." For example, the return contact statistic may be the average length of time between when the return contact from the recipient is received at the ASP system and when the return contact is forwarded to the requestor ("hold time"). When the average length of time is greater than a requestor-specific length of time, then the ASP system may reduce the message dispatch rate. Conversely, when the average length of time is less than a requestor-specific length of time, then the ASP system may increase the message dispatch rate. The ASP system may store a requestor-specific range for the control. The ASP system may adjust the message dispatch rate to help ensure that the value of the control stays within the requestor-specific range. The ASP system may also allow the requestor to specify a minimum and maximum message dispatch rate, a rate adjustment interval indicating how often the rate can be adjusted, a rate adjustment increment indicating by how much the rate can be adjusted, and so on.

In one embodiment, the ASP system uses the message dispatch rate to regulate the number of dispatched messages that invite a return contact by the recipient. For example, if the messages are sent to the recipients via telephone calls to them, then the message may ask the recipients if they want to be connected to an agent of the requestor. If a recipient responds affirmatively to the invitation (e.g., by pressing a button on the telephone), then the ASP system may initiate a transfer of the telephone call to a call center of the requestor. The ASP system may dispatch messages for a requestor at a constant rate, but selectively enable the invitation for a return contact to match the message dispatch rate. In such a case, the message dispatch rate controls the rate at which invitations for return contacts are included in the messages.

Figure 1:
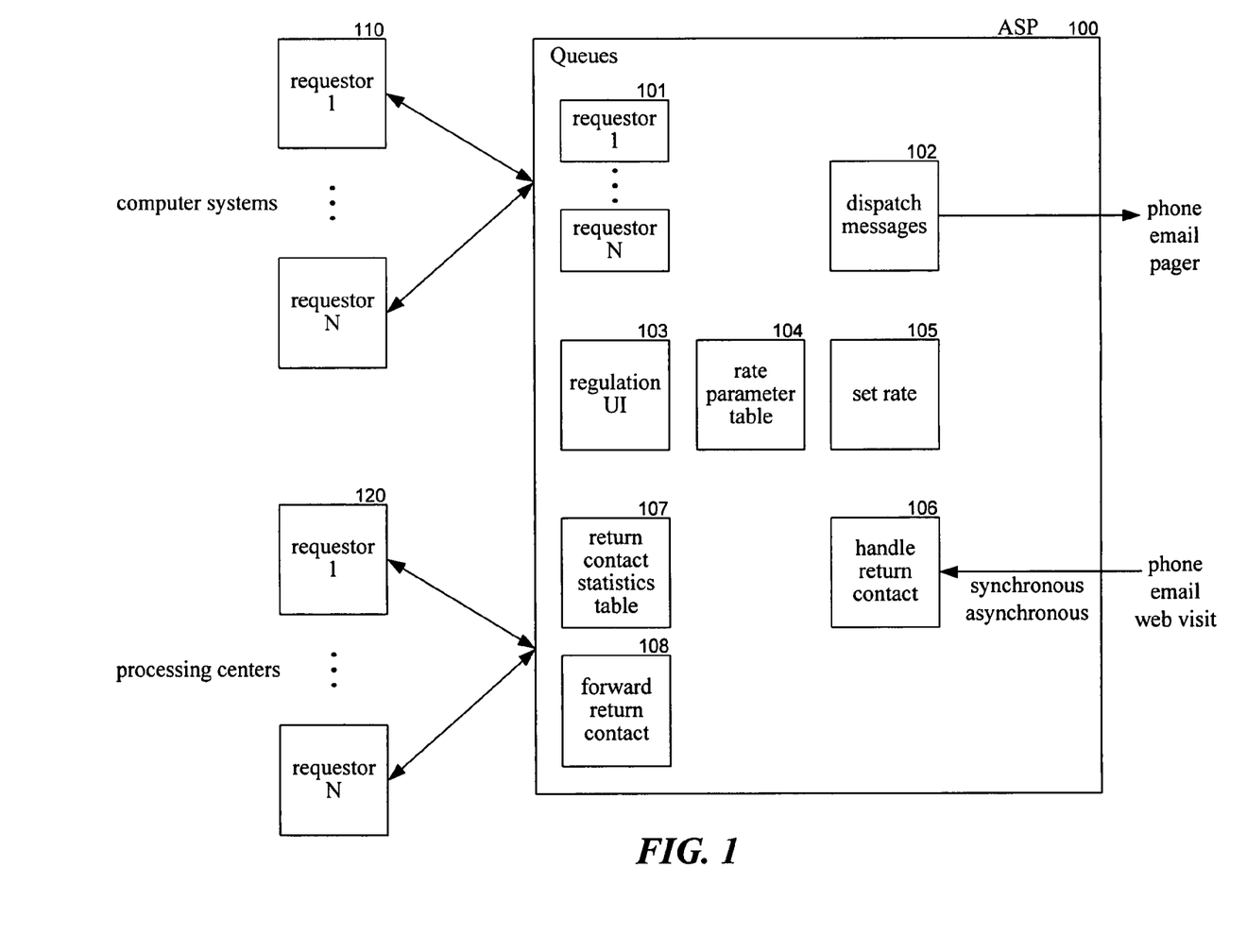
FIG. 1 is a block diagram illustrating components of the ASP system in one embodiment.

FIG. 1 is a block diagram illustrating components of the ASP system in one embodiment. The ASP system 100 includes a request queue 101 for each requestor. The ASP system receives requests from the requestor computer systems 110 and stores the received requests in the request queues. Each requestor computer system may include an extraction component that identifies events and entities that should be notified and then sends requests to notify the entities to the ASP system. For example, if the requestor is an airline, then the extraction component may periodically check a flight schedule database for changes. When a change is detected for which passengers should be notified, the extraction component then retrieves passenger information for each passenger scheduled on that flight and sends a request to the ASP system for each passenger. Each request may be in a standard format and may identify the type of event (e.g., canceled flight), the recipient, and the requestor.

The ASP system includes a dispatch messages component 102 that retrieves requests from the request queues and that generates and dispatches messages in accordance with the retrieved requests. The dispatch messages component may generate the message for a request based on rules specific to each requestor. For example, one airline may want its canceled flight notifications sent via an electronic mail message, and another airline may want its canceled flight notifications sent via a telephone call.

The ASP system also includes a regulation user interface component 103 that provides an interface through which rate parameters of each requestor can be set. The regulation user interface component may provide a web-based interface through which a requestor can view and modify the requestor-specific rate parameters, which are stored in a rate parameter table 104. The rate parameter table contains an entry for each requestor. Each entry contains requestor-specific rate parameters. Table 1 describes the rate parameters in one embodiment.

TABLE 1

| Parameter | Description |
| --- | --- |
| control | average hold time, maximum hold time, or number of transfers |
| control period | time over which the value for the control is to be collected |
| control ceiling | maximum value of the range for the control |
| control midpoint | optimum value for the control |
| control floor | minimum value of the range for the control |
| increment factor | maximum amount by which the message dispatch rate can be increased |
| increment interval | minimum time between incrementing the message dispatch rate |
| decrement factor | maximum amount by which the message dispatch rate can be decreased |
| decrement interval | minimum time between decrementing the message dispatch rate |
| rate ceiling | maximum message dispatch rate |
| rate floor | minimum message dispatch rate |
| rate override | fixed message dispatch rate |
| current rate | message dispatch rate as dynamically set by the dispatch message component |
| trend indicator | true if trending is enabled |
| trend [1 . . . 4] | weights for trending periods |

A set rate component 105 periodically adjusts the message dispatch rate for each requestor based on the rate parameters and the return contact statistics. The return contact statistics are stored in a return contact statistics table 107. The table may contain information describing each return contact, such as recipient, time of arrival, time of forwarding, and ultimate disposition. The dispatch messages component uses the current dispatch message rate for a requestor as calculated by the set rate component and stored in the rate parameter table. The set rate component may calculate a new rate based on the value of the requestor-specific control. In addition, the set rate component may use a weighted value to help smooth any large changes in the value, referred to as "trending."

A handle return contact component 106 receives various return contacts from the recipients. The return contacts may be electronic mail messages, access to a web page, telephone calls, and so on. In the case that the message is dispatched via a telephone call, then the return contact may be via that same telephone call. In one embodiment, the recipient of a telephone call is requested to indicate whether they want to talk with the requestor directly. If so, then the telephone call is transferred to a call center of the requestor. The return contacts may be either synchronous or asynchronous. A synchronous return contact, for example, is one in which the recipient of a telephone call indicates a desire to talk with the requestor during the same telephone call. For example, the message may indicate that a flight has been canceled and ask the recipient if they want to talk to an agent to reschedule. An asynchronous return contact, for example, is one in which the recipient sends an electronic mail message. The timing of synchronous return contacts may be more predictable and controllable than the timing of asynchronous return contacts.

A forward return contact component 108 forwards the return contacts to the appropriate return contact processing centers 120 for the requestors. For example, the return contact processing centers may include a call center or an electronic mail account of the requestor. The return contact processing centers may provide status information to the ASP system so that the forwarding of the return contacts does not overwhelm the processing centers. Thus, the ASP system may effectively queue return contacts for requestors.

The computer systems of the ASP system, the requestor computer systems, and the return contact processing centers may include a central processing unit, memory, input devices (e.g., keyboard and pointing devices), output devices (e.g., display devices), and storage devices (e.g., disk drives). The memory and storage devices are computer-readable media that may contain instructions implementing the ASP system. In addition, the data structures and message structures may be stored or transmitted via a data transmission medium, such as a signal on a communications link. Various communications links may be used, such as the Internet, a local area network, a wide area network, or a point-to-point dial-up connection.

Figure 2:
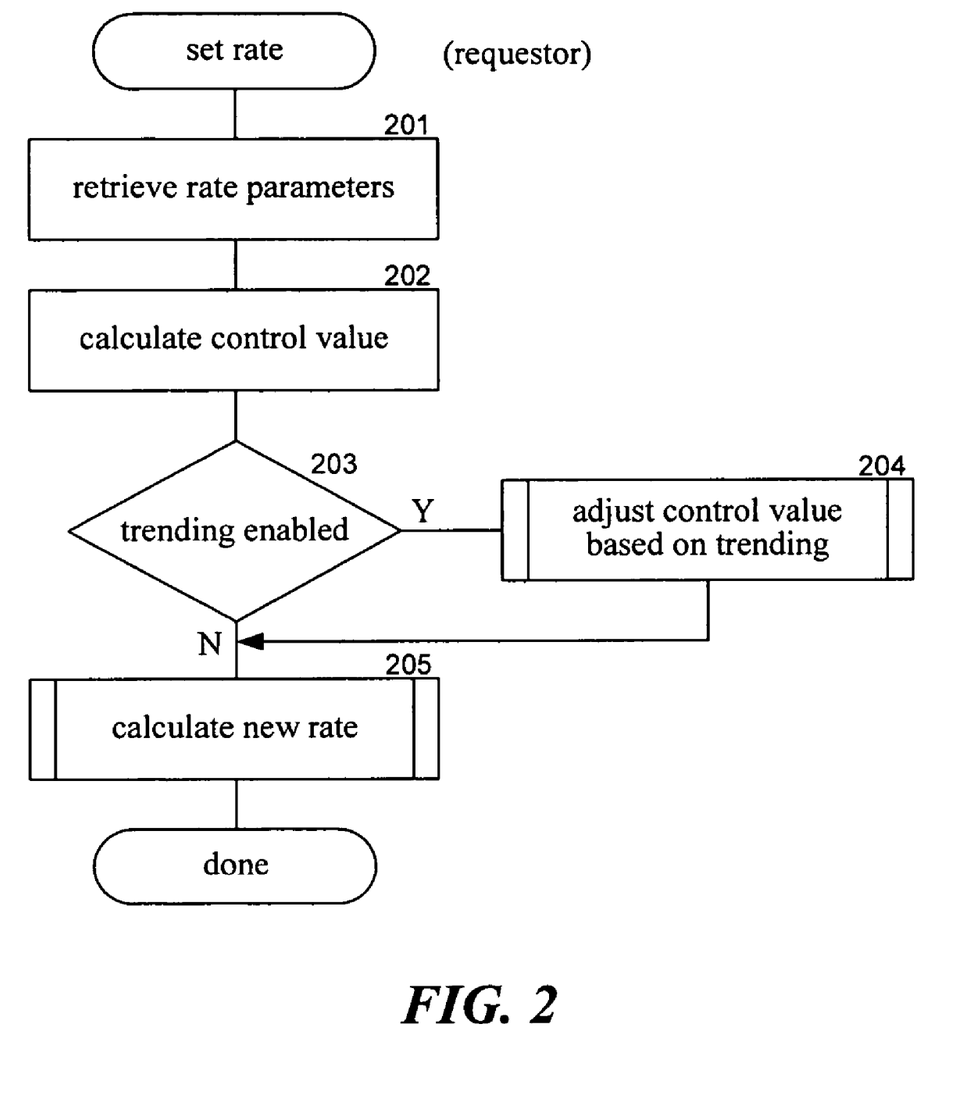
FIG. 2 is a flow diagram illustrating the processing of a set rate component in one embodiment.

FIG. 2 is a flow diagram illustrating the processing of a set rate component in one embodiment. The component is passed the identification of a requestor and updates the current message dispatch rate for that requestor in the rate parameter table. In block 201, the component retrieves the requestor-specific rate parameters from the rate parameter table. In block 202, the component calculates the current value for the requestor-specific control based on the statistics of the return contacts statistics table. For example, the requestor-specific control may be the average hold time of a telephone call at the ASP system before it is transferred to a call center of the requestor. In block 203, if trending is enabled, then the component continues at block 204, else the component continues at block 205. In block 204, the component invokes the adjust control value based on trending component. The term "trending" refers to weighting the current value based on the value calculated during past intervals. In this way, the component effectively smoothes any rapid change in the value of the requestor-specific control. In block 205, the component invokes the calculate new rate component, which calculates a new rate and stores it in the rate parameter table. The component then completes.

Figure 3:
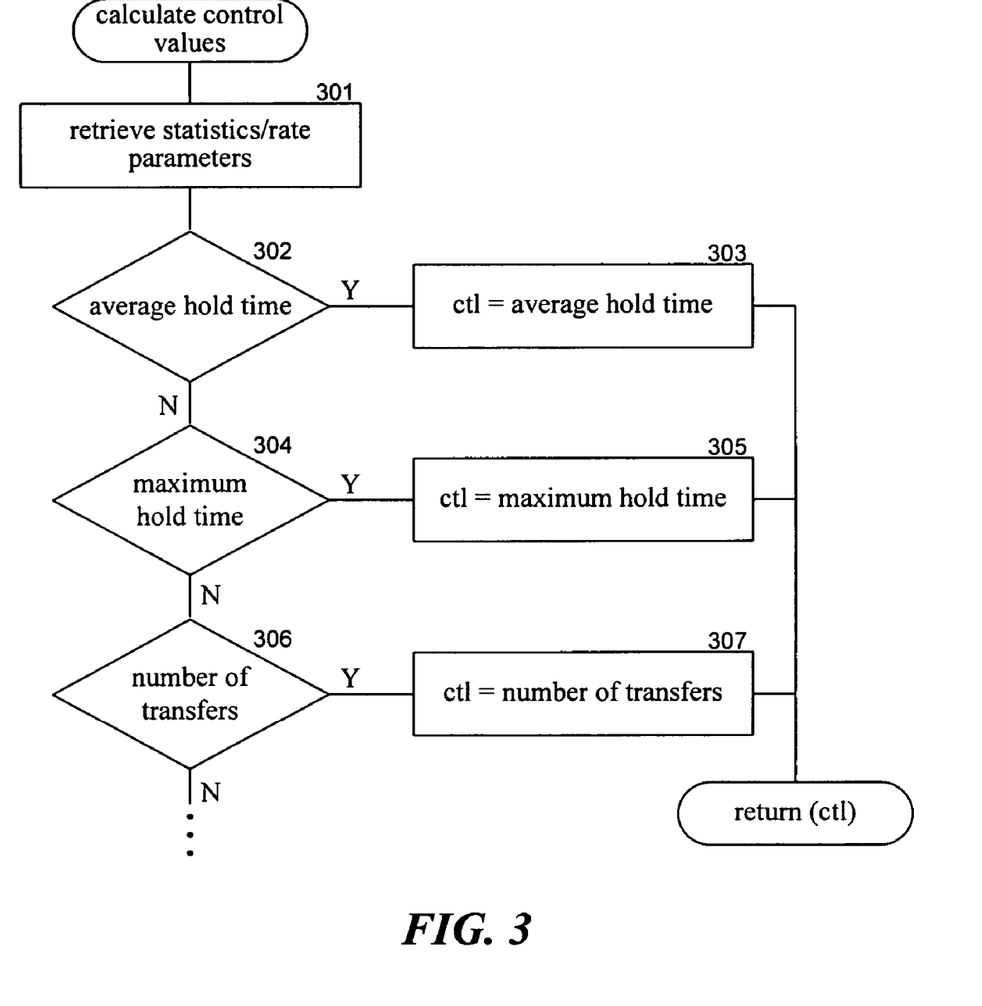
FIG. 3 is a flow diagram illustrating the processing of the calculate control value component in one embodiment.

FIG. 3 is a flow diagram illustrating the processing of the calculate control value component in one embodiment. This component is passed the identification of a requestor, retrieves the return contact statistics and rate parameters for the requestor, and calculates a value for the requestor-specific control. In block 301, the component retrieves the return contact statistics and the rate parameters for the requestor. In decision blocks 302, 304 and 306, the component identifies the requestor-specific control for the requestor. In one embodiment, the requestor-specific control can be average hold time, maximum hold time, or number of transfers. One skilled in the art will appreciate that many different controls can be defined to allow more flexibility in controlling the message dispatch rate. For example, a control may be based on a percentage of return contact telephone calls in which the recipient hangs up before the call is transferred to the requestor. In blocks 303, 305 and 307, the component sets the value based on the requestor-specific control and the return contact statistics. The component then returns the control value.

Figure 4:
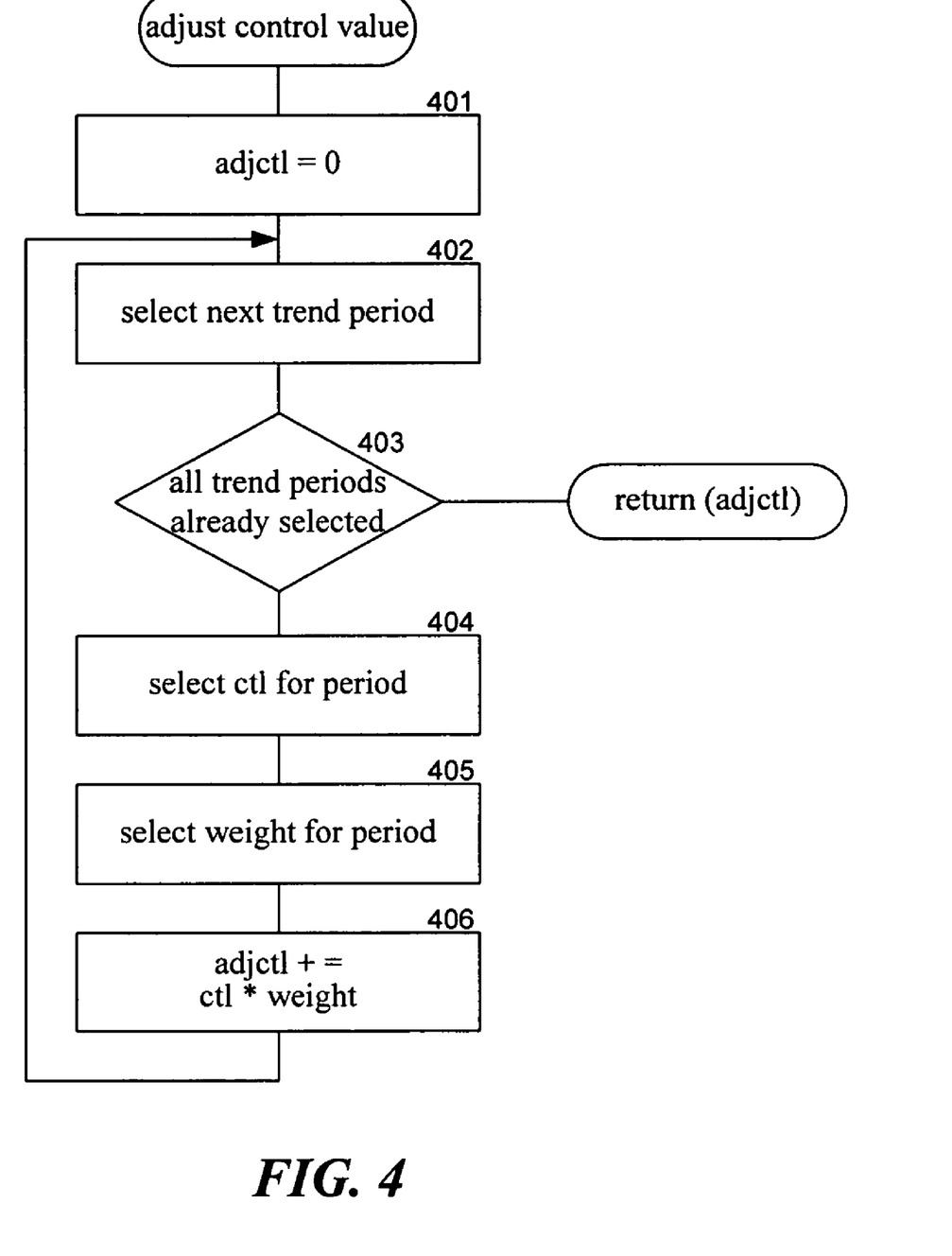
FIG. 4 is a flow diagram illustrating the processing of the adjust control value component in one embodiment.

FIG. 4 is a flow diagram illustrating the processing of the adjust control value component in one embodiment. The component is passed the identification of the requestor and the newly calculated value for the requestor-specific control. The component adjusts the value using trending by calculating an adjusted value by a weighted average of previous values. The ASP system may calculate a new value for a requestor for every requestor-specific control period as indicated in the rate parameter table. In block 401, the component initializes an adjusted value to zero. In blocks 402-406, the component loops factoring in the weighted value for the previous trend periods. In block 402, the component selects the next trend period. In decision block 403, if all the trend periods have already been selected, then the component returns the adjusted value, else the component continues at block 404. In block 404, the component selects the value for the selected trend period from the rate parameter table. In block 405, the component selects the weight for the selected trend period from the rate parameter table. In block 406, the component adds the weighted value to the adjusted value and loops to block 402 to select the next trend period.

Figure 5:
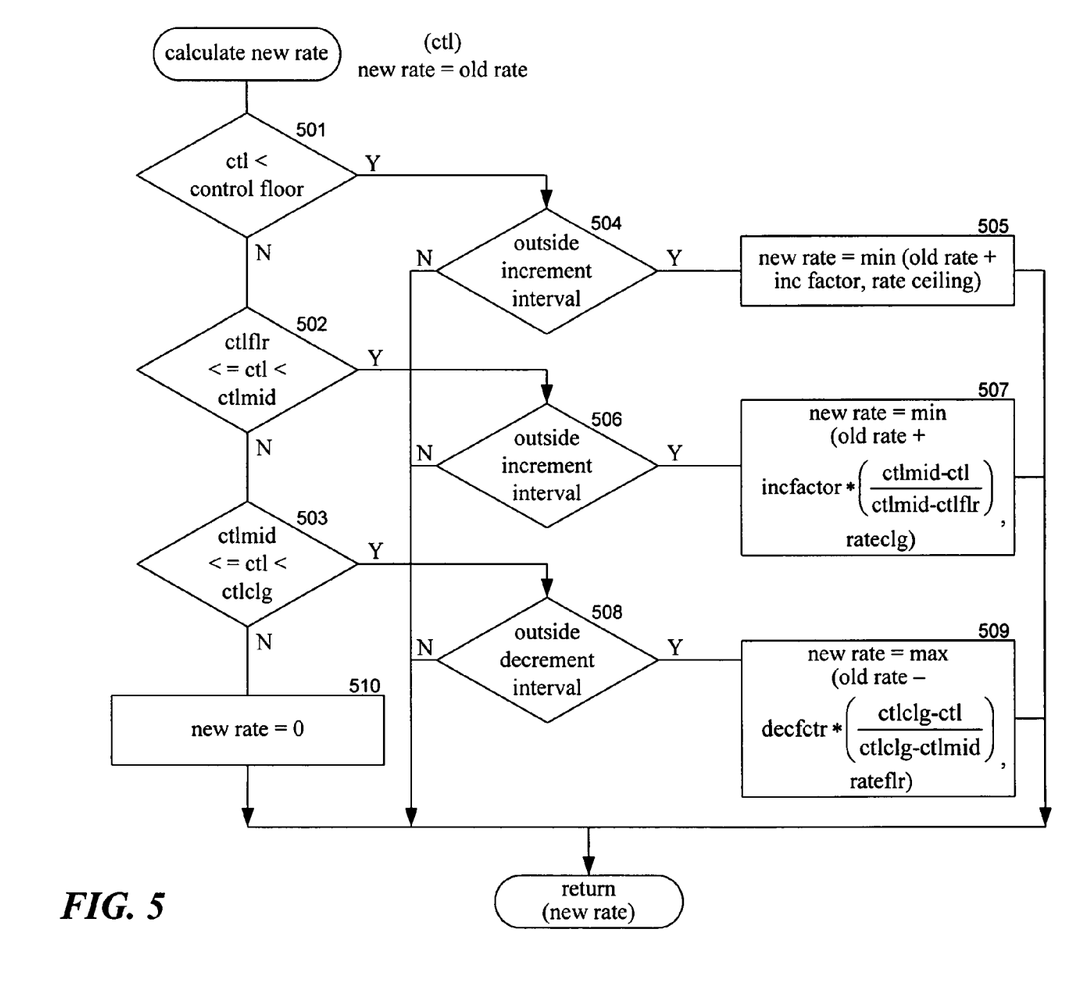
FIG. 5 is a flow diagram illustrating the processing of the calculate new rate component in one embodiment.

FIG. 5 is a flow diagram illustrating the processing of the calculate new rate component in one embodiment. The component is passed the value of the requestor-specific control and initially sets the new rate to the old rate. The component then uses the requestor-specific parameters of the rate parameter table to control the setting of the new rate. In decision blocks 501-503, the component determines whether the value is less than the control floor, greater than the control floor and less than the control midpoint, greater than the control midpoint and less than the control ceiling, or greater than the control ceiling. If the control value is less than the control floor, the component continues at block 504. In decision block 504, if the time is outside of the increment interval for the requestor, then the component continues at block 505, else it is too soon to increment the message dispatch rate and the component returns with the old rate as the new rate. In block 505, the component sets the new rate to the minimum of the old rate plus the entire increment factor, and the rate ceiling. The component then returns. This ensures that the rate is increased as much as possible without exceeding the rate ceiling. If the value is between the control floor and the control midpoint, then the component continues at block 506. In decision block 506, if the time is outside of the increment interval, then the component continues at block 507, else it is too soon to increment the message dispatch rate and the component returns with the old rate as the new rate. In block 507, the component sets the new rate to the minimum of the old rate plus the increment factor adjusted linearly based on the value relative to the control midpoint and the control floor, and the rate ceiling. This ensures that the rate is increased in proportion to the amount the value is less than the control midpoint without exceeding the rate ceiling. The component then returns. If the value is greater than the control midpoint and less than the control ceiling, then the component continues at block 508. In decision block 508, if the time is outside of the decrement interval, then the component continues at block 509, else it is too soon to decrement the message dispatch rate and the component returns the old rate as the new rate. In block 509, the component sets the new rate to the maximum of the old rate minus the decrement factor linearly adjusted based on the value relative to the control midpoint and the control ceiling, and the rate floor. This ensures that the new rate is decremented in proportion to the amount the value exceeds the control midpoint without being less than the rate floor. The component then returns. If the value is greater than the control ceiling, then the component continues at block 510. In block 510, the component sets the new rate to zero and then returns. This ensures that new messages will not be dispatched until the value becomes less than the control ceiling.

Figure 6:
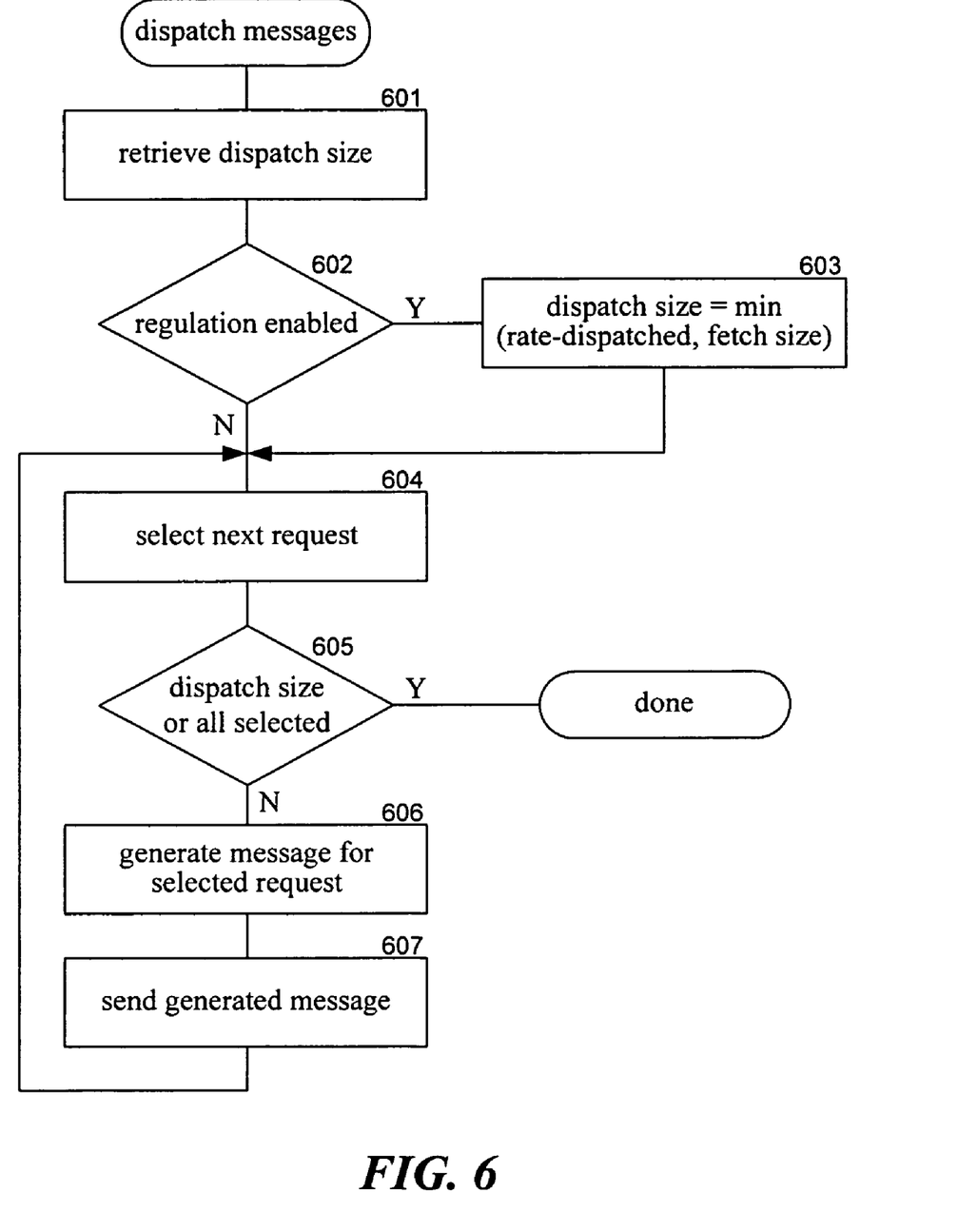
FIG. 6 is a flow diagram illustrating the processing of the dispatch messages component in one embodiment.

FIG. 6 is a flow diagram illustrating the processing of the dispatch messages component in one embodiment. The component is passed the identification of the requestor whose messages are to be dispatched. The ASP system may invoke the dispatch messages component in a round-robin manner for each requestor. During each round, the component may dispatch a number of messages indicated by a requestor-specific dispatch size. The component dispatches a maximum of the dispatch size number of messages for the requestor during each round. In block 601, the component retrieves the dispatch size. In decision block 602, if regulation of the message dispatch rate is enabled for this requestor, then the component continues at block 603, else the component continues at block 604. In block 603, the component sets the dispatch size to the minimum of the number of messages to be dispatched to achieve the message dispatch rate for the requestor minus the number of messages that have already been dispatched for the requestor during a certain interval and the retrieved dispatch size. For example, if the message dispatch rate is 100 messages per minute and the ASP system dispatched 90 messages in the first 30 seconds of the minute, then the component will limit the fetch size to 10 so that message dispatch rate is not exceeded. In blocks 604-607, the component loops, dispatching the number of messages indicated by the dispatch size. In block 604, the component selects the next request from the requestor's request queue. In decision block 605, if the dispatch size number of messages has already been dispatched or all the requests have already been selected, then the component completes, else the component continues at block 606. In block 606, the component generates the message for the selected request. In block 607, the component sends the generated message to the recipient and loops to block 604 to select the next request.

One skilled in the art will appreciate that although specific embodiments of the ASP system have been described herein for purposes of illustration, various modifications may be made without deviating from the spirit and scope of the invention. Accordingly, the invention is not limited except by the appended claims.

We claim:

1. A computer system for regulating the sending of messages that generate return contacts, comprising:
 a request store for storing requests to send messages to recipients, each request being received from one of a plurality of requestor systems;
 a message dispatcher for retrieving requests from the request store, generating messages, and sending the generated messages according to a requestor-specific rate;
 a return contact handler for forwarding return contacts by recipients of messages to the requestors and generating statistics relating to the forwarding of the return contacts to each requestor;
 a rate parameter store for storing requestor-specific rate parameters; and
 a set rate component that sets a message dispatch rate for each requestor based on the requestor-specific rate parameters of the rate parameter store and the generated statistics.

2. The computer system of claim 1 wherein a message is sent via a telephone call.

3. The computer system of claim 2 wherein the return contact is via the same telephone call.

4. The computer system of claim 3 wherein the return contact component transfers the telephone call to an agent of the requestor only after the recipient of the telephone call indicates a willingness to talk to an agent of the requestor.

5. The computer system of claim 1 wherein the message is an electronic mail message.

6. The computer system of claim 5 wherein the return contact is an electronic mail message.

7. The computer system of claim 5 wherein the return contact is visiting a web site identified in the electronic mail message.

8. The computer system of claim 5 wherein the electronic mail message includes instructions for the recipient to request the requestor to place a call to the recipient.

9. The computer system of claim 8 wherein the instructions indicate to reply to the electronic mail message.

10. The computer system of claim 8 wherein the instructions indicate to select a link within the electronic mail message.

11. The computer system of claim 1 wherein the message dispatch rate is derived from a value of a requestor-specific control and a requestor-specific range of control values.

12. The computer system of claim 1 wherein the message dispatch rate indicates the number of messages to dispatch that invite a return contact.

13. A method in a computer system for regulating the sending of messages from requestors to recipients, where each message, at the discretion of the recipient, results in a return contact to the requestor by the recipient, the method comprising:
 for each of a plurality of requestors,
  receiving messages from a computer system of the requestor;
  identifying a value for requestor-specific control indicating a characteristic of return contacts to the requestor by recipients;
  when the identified value is below a requestor-specific range of the requestor-specific control, setting a new message dispatch rate to a maximum message dispatch rate;
  when the identified value is within a requestor-specific range of the requestor-specific control, setting a new message dispatch rate based on the identified value relative to the requestor-specific range;
  when the identified value is above a requestor-specific range of the requestor-specific control, setting a new message dispatch rate to a minimum message dispatch rate; and
  dispatching the received messages at the new message dispatch rate.

14. The method of claim 13 wherein the requestor-specific control is based on the time between a recipient's initiating a return contact and the establishment of a return contact with the requestor.

15. The method of claim 14 wherein the requestor-specific control is based on the maximum of the times.

16. The method of claim 14 wherein the requestor-specific control is based on the average of the times.

17. The method of claim 13 wherein the requestor-specific control is based on the number of return contacts established between a recipient and a requestor.

18. The method of claim 13 wherein the setting of the new message dispatch rate when the identified value is within the requestor-specific range, sets the new message dispatch rate based on the difference between the identified value and a designated point within the requestor-specific range at which the new message dispatch rate is the same as the current message dispatch rate.

19. The method of claim 18 wherein the new message dispatch rate varies linearly between the designated point and the ends of the requestor-specific range.

20. The method of claim 13 wherein the messages are dispatched as electronic mail messages.

21. The method of claim 13 wherein the messages are dispatched as telephone calls.

22. The method of claim 13 wherein the message dispatch rate indicates the rate at which messages that invite a return contact are to be dispatched.

23. The method of claim 22 wherein the messages are modified to invite or not invite a return contact.

24. An application service provider system for regulating the sending of messages that generate calls to be transferred to requestors, comprising:
   a request store for storing requests to send messages to recipients, each request being received from one of a plurality of requestor systems;
   a message dispatcher for retrieving requests from the request store, generating messages, and sending the messages according to a requestor-specific message dispatch rate;
   a call handler for transferring calls with recipients of messages to call centers of the requestors and generating statistics relating to the transferring of calls to each requestor's call center;
   a rate parameter store for storing requestor-specific rate parameters; and
   a set rate component that sets a message dispatch rate for each requestor based on the requestor-specific rate parameters of the rate parameter store and the generated statistics.

25. The application service provider system of claim 24 wherein a message is sent via a telephone call.

26. The application service provider system of claim 25 wherein the call handler transfers a call only after the recipient of the message indicates a willingness to talk to an agent of the requestor.

27. The application service provider system of claim 24 wherein the message is an electronic mail message.

28. The application service provider system of claim 27 wherein the electronic mail message includes instructions for the recipient to request that the requestor place a call to the recipient.

29. The application service provider system of claim 28 wherein the instructions indicate to reply to the electronic mail message.

30. The application service provider system of claim 28 wherein the instructions indicate to select a link within the electronic mail message.

31. The application service provider system of claim 24 wherein the messages are dispatched at a message dispatch rate derived from a value of a requestor-specific control and a requestor-specific range for the value of the requestor-specific control.

32. A method in a computer system for regulating the sending of messages from requestors to recipients, each message inviting the recipient to have a telephonic discussion with the requestor, the method comprising:
   for each of a plurality of requestors,
      receiving messages from a computer system of the requestor;
      identifying a value of a requestor-specific control indicating a characteristic of telephone calls between the requestor and recipients;
      identifying a current message dispatch rate of sending messages to recipients;
      when the identified value is below a requestor-specific range of the requestor-specific control, setting a new message dispatch rate to a maximum message dispatch rate;
      when the identified value is within a requestor-specific range of the requestor-specific control, setting a new message dispatch rate based on the identified value within the requestor-specific range and the identified current message dispatch rate;
      when the identified value is above a requestor-specific range of the requestor-specific control, setting a new message dispatch rate to a minimum message dispatch rate; and
      dispatching the received messages at the new message dispatch rate.

33. The method of claim 32 wherein the requestor-specific control is based on the time between a recipient's indicating acceptance of an invitation to talk to the requestor and establishment of a connection between the recipient and the requestor.

34. The method of claim 32 wherein the requestor-specific control is based on the maximum of the times.

35. The method of claim 32 wherein the requestor-specific control is based on the average of the times.

36. The method of claim 32 wherein the requestor-specific control is based on the number of connections established between a recipient and a requestor.

37. The method of claim 32 wherein the setting of the new message dispatch rate when the identified value is within the requestor-specific range, sets the new message dispatch rate based on the difference between the identified value and a designated point within the requestor-specific range at which the new message dispatch rate is the same as the current message dispatch rate.

38. The method of claim 37 wherein the new rate varies linearly between the designated point and the ends of the requestor-specific range.

39. The method of claim 32 wherein the messages are dispatched as electronic mail messages.

40. The method of claim 32 wherein the messages are dispatched as telephone calls.

* * * * *